April 13, 1926.  
E. ROUČKA  
1,580,678  
FLOW REGULATING AND MEASURING DEVICE  
Filed August 16, 1921  
4 Sheets-Sheet 1

INVENTOR  
Erich Roučka

April 13, 1926.
E. ROUČKA
FLOW REGULATING AND MEASURING DEVICE
Filed August 16, 1921  4 Sheets-Sheet 2
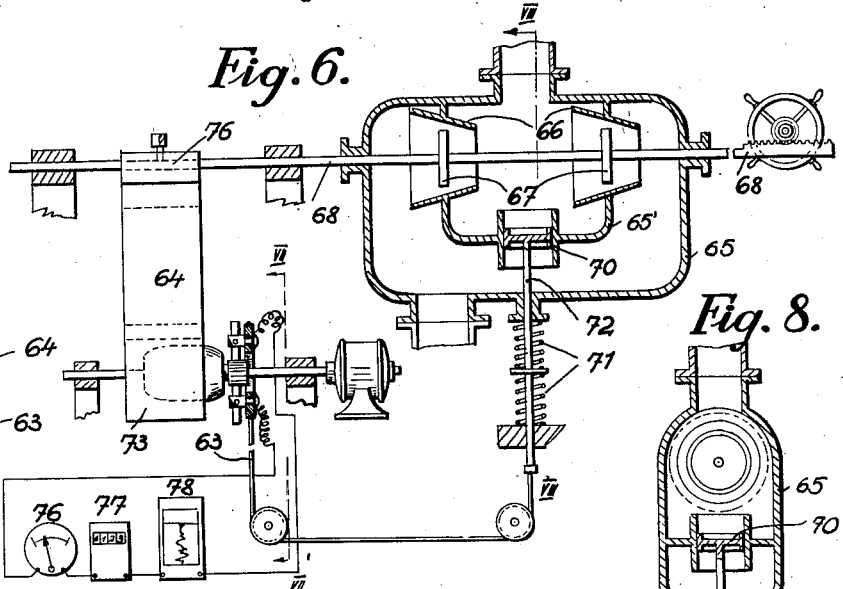
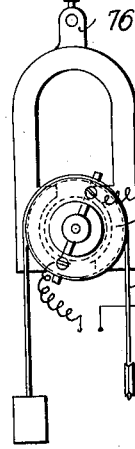
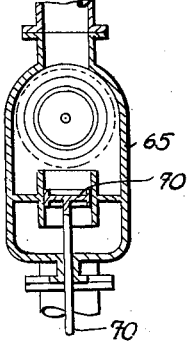
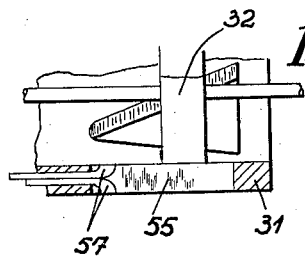
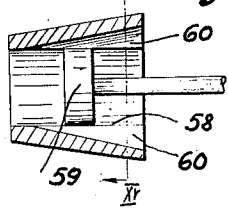
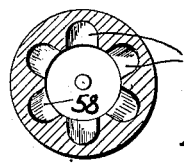
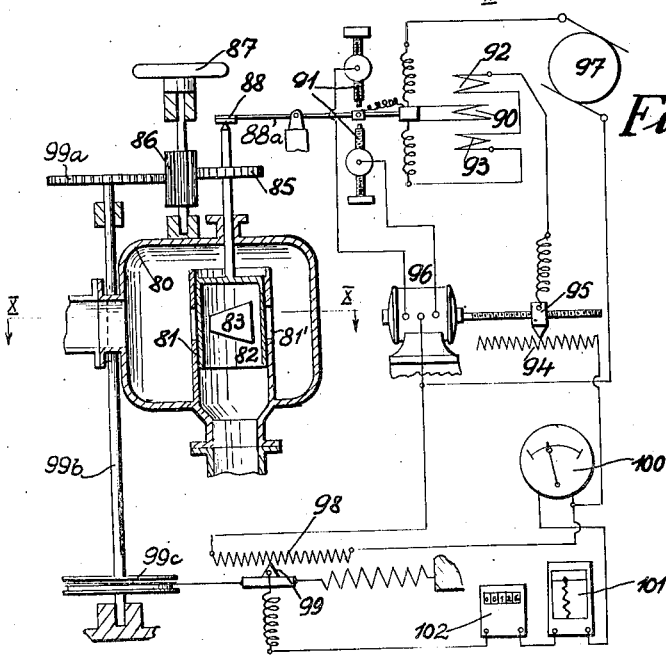
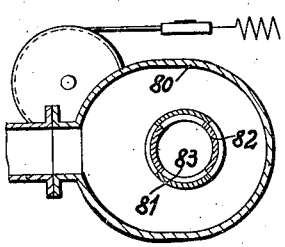
INVENTOR
Erich Roučka April 13, 1926.
E. ROUČKA
FLOW REGULATING AND MEASURING DEVICE
Filed August 16, 1921   4 Sheets-Sheet 3
1,580,678
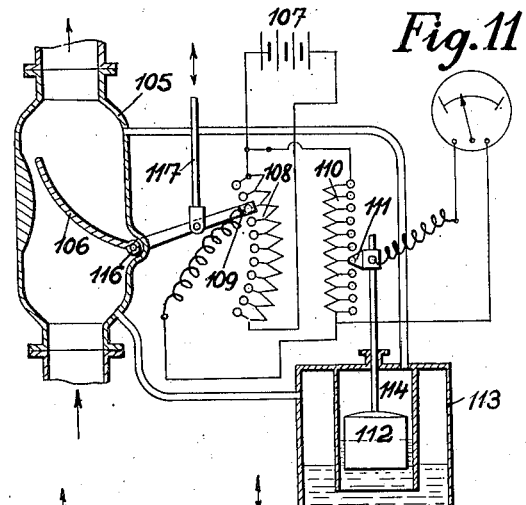
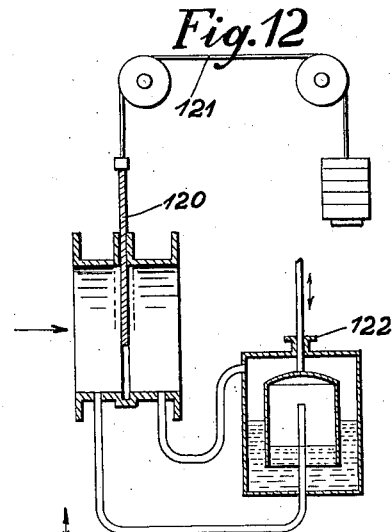
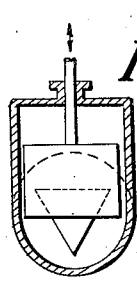
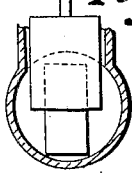
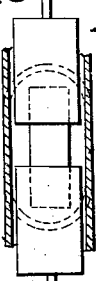
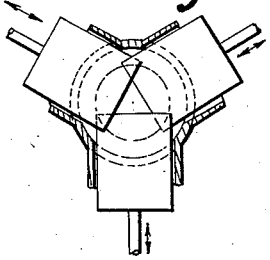
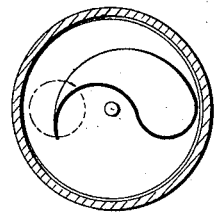
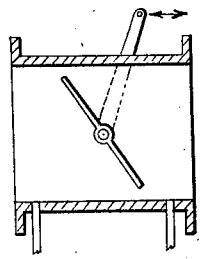
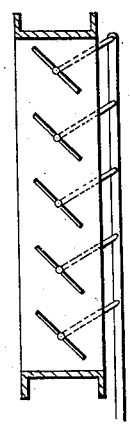
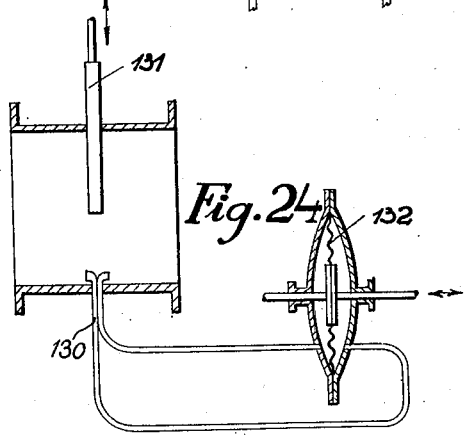
INVENTOR

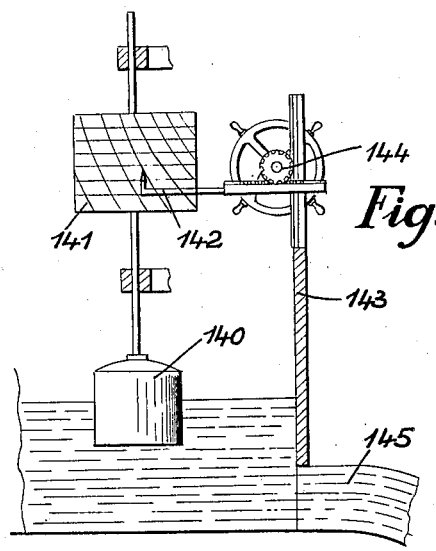
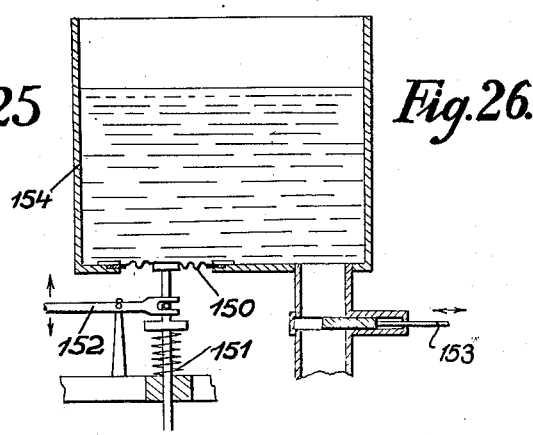
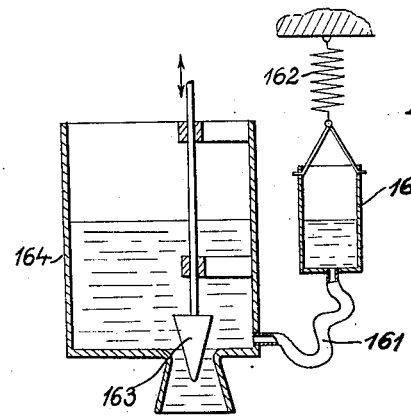
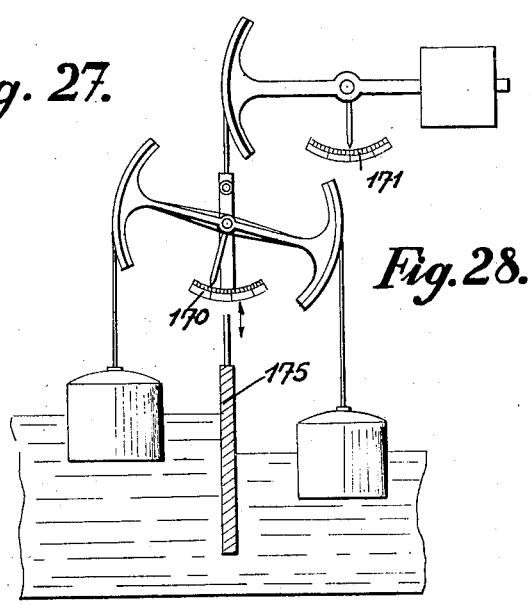
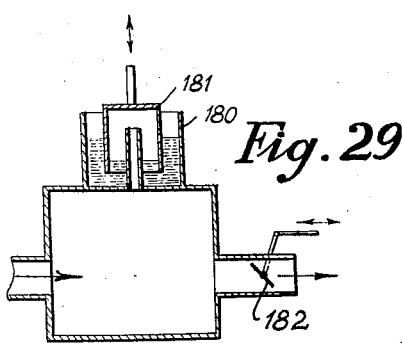
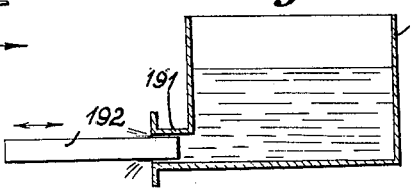

Patented Apr. 13, 1926.

1,580,678

UNITED STATES PATENT OFFICE.

ERICH ROUČKA, OF BLANSKO, CZECHOSLOVAKIA.

FLOW REGULATING AND MEASURING DEVICE.

Application filed August 16, 1921. Serial No. 492,865.

*To all whom it may concern:*

Be it known that ERICH ROUČKA, a citizen of Czechoslovakia, residing at Blansko, Czechoslovakia, has invented certain new and useful Improvements in Flow Regulating and Measuring Devices, of which the following is a specification.

My invention relates to an apparatus which is intended to serve as a regulating and at the same time as a measuring device for regulating and measuring a flowing medium. The invention consists in the arrangement whereby a device that throttles or determines the area of passage is caused to act in co-operation with a device that is influenced by a determined quantity of the flowing medium, so that I obtain results or effects which are to be ascribed to the said determined quantity, as also to the size of the area of passage at the place which is throttled. In this way I am able as a result to obtain particulars of the velocity of flow or of the weight of the fluid flowing through in a unit of time. A very particular advantage of my present invention is that no further fall of pressure arises through the measuring, because the fall of pressure of the regulating device itself is made serviceable for the measuring. A further important advantage is that the initial values when the velocity of flow is slight are more exact than the indications of the known orifice or Venturi meter. The regulating of the throttling can be effected in various known ways, either the throttling area may be varied, or the length of the throttle place of passage or both values, may be varied. I can obtain these variations by moving the throttling device in the direction of flow of the fluid or perpendicularly or obliquely to that direction, or I can employ rotary devices for this purpose.

I can effect the varying of the throttling either by hand, direct or with an intermediately arranged lever or other means of transmission, or by motors which are actuated either by hand or automatically by suitable controlling devices. The flow of the fluid is expressed either as fall of pressure at the throttling place or as overpressure in the case of one-sided constant pressure (Figure 29). This flow may however be expressed as the difference of pressure in the case of Venturi pipe (Figure 1) or Pitot pipes (Figure 24); further, in the case of liquids the flow may be deduced from the level of the liquid (Figure 25) or difference of level (Figure 28). These values may act on simple or differential diaphragm pistons (with straight or rotary stroke) as well as on floats, bells or communicating vessels, etc.

According to the invention the effect of the specific flow is joined to the value of the throttling (for example multiplied) in connection wherewith if necessary I can employ suitable means of transmission (cams or the like, Figure 3).

In the practical application of my invention the one value, for example, the extent of the throttling adjusts the position of the scale, and the other value, for example the fall of pressure, the indicator, in which manner the co-operative effect of the two values can be graphically shown (Figure 1). Or I can obtain a mechanical co-operation, in which the two effects are joined and expressed together through levers or power gear (Figure 2). I can, however, also employ logarithmical gear (Figure 3) or electric auxiliary means with resistances, choking coils in accordance with the dynamometrical principle (Figures 6, 9, 11) or the like.

The result of this co-operation I can make use of direct in apparatus (Figures 1 and 2) viz, for advertising, recording, integrating or composing in suitable instruments or relays, or with the aid of known apparatus or new distant signalling apparatus dealt with by me in special patent applications, I can transmit this result to any distance, where the desired announcements or regulating actions can then be effected.

In the accompanying drawings I have illustrated the object of the invention in various examples. It is, however, clear that the invention can be carried out in the most varied ways, without going beyond the range of the inventive idea, which consists in this viz, that the value of the passage area or the value of the resistance to the flowing medium co-operates with another of the determining values of the flowing medium so as to obtain accurate indications or effects.

In the drawings Figure 1 illustrates a simple form of apparatus according to the invention with an adjustable scale.

Figures 4 and 5 illustrate details of Figure 2.

Figure 6 shows a composition by electrical method.

Figures 7 and 8 represent sections through VII—VII and VIII—VIII in Figure 6.

Figure 9 illustrates a form, in which the throttling device is constructed as a rotary slide, with the employment of electric energy for indicating and regulating.

Figure 10 is a section through X—X in Figure 9. Figure 11 shows a regulating arrangement with electric auxiliary energy, a regulating valve being employed.

Figure 12 shows a simple form for air-draughts or flues in boiler installations.

Figure 13 shows the employment of a Pitot pipe in the form of the arrangement as in Figure 3.

Figure 14 illustrates modified form for piston regulating.

Figure 15 is a transverse sectional view, taken on the line XV—XV of Figure 14.

Figures 16 to 21 show different forms of throttling by means of slides.

Figure 22 represents a double sided throttle valve.

Figure 23 an arrangement for throttling with assistance of a number of valves.

Figure 24 represents the employment of the Pitot pipe in the open stream.

Figure 25 shows the arrangement for regulating outflow of a fluid.

Figure 26 shows the employment of a hydrostatic pressure for regulating the flow of a fluid.

Figure 27 represents the employment of an auxiliary vessel for regulating purposes.

Figure 28 shows a combined arrangement with a difference of level.

Figure 29 represents a measuring and regulating arrangement with one sided constant pressure.

Figure 30 illustrates a controlling arrangement in which the length of the throttle is varied, the sectional area being constant.

Figure 1:
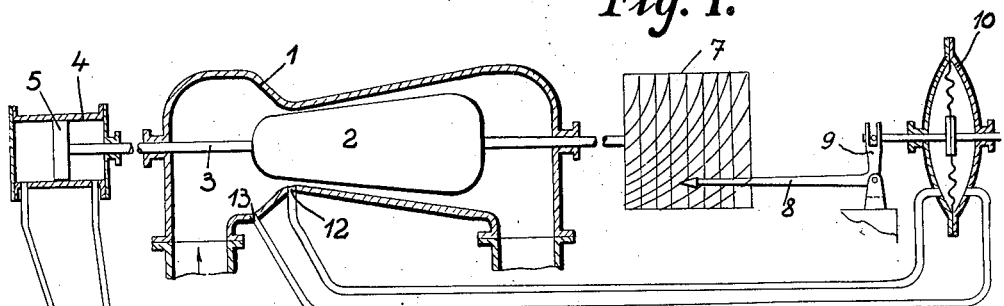

With reference to Figure 1, 1 is the body of a valve in which a conical throttling device 2 moves through the medium of a rod 3 with the assistance of a servo-motor 4 with piston 5, and thereby throttles the area of passage to a greater or less extent. The regulating (flow resisting device) 1, 2 is so constructed that the flow takes place in accordance with the venturi law. In the cross-sectional area of the valve in different positions of the body 2, the smallest cross-section will always be that which gradually enlarges in the direction of the flow of the fluid, so that the greatest fall of pressure is at 12. The rod 3 of the body 2 carries a scale 7. On this scale a pointer 8 moves, which is actuated by a differential pressure device 10, for example a differential diaphragm, through a transmission device 9.

In the differential pressure device 10 acts the difference of pressure between the full pressure of the fluid in the place 13 and the greatest fall of pressure at the narrowest place 12.

On the scale 7 each position of the regulator 2 corresponds to a gradation adapted to the throttling cross section at the time, which gradation always comes under the pointer 8 so that the pointer always indicates the correct value of the velocity of flow on the part of the scale situated below.

Figure 2:
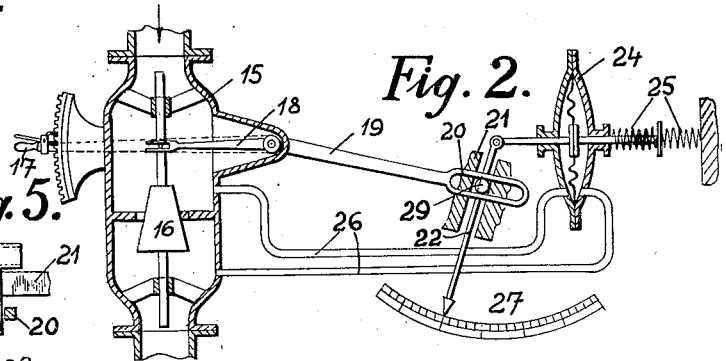
Figure 2 shows another form, in which the composition is effected mechanically.
Figure 2:
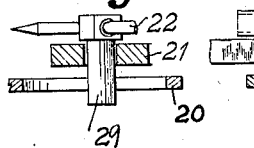

Figure 2 represents a form of construction in which the two values which affect the pointer join, in connection wherewith the indications are effected on a non-varying scale. The gear which is here employed and is of a known kind certainly does not act with mathematical accuracy; the perfectly correct acting mechanical composition gear that forms the object of my other applications may be however employed here. 15 is the regulator casing, 16 the throttling device, which can be moved by hand by means of a lever 17, for example, on a yoke and a lever 18. Connected with the levers 17 and 18 is a lever 19 which in moving moves a pin 29 that moves in a guide 21, with the assistance of a slot 20. The pin 29 serves as guide for the pointer 22 slidably mounted therein, and as pivot for said pointer. According to the position of the pivot 29 the leverage of the pointer 22 varies. The pointer is connected with the diaphragm of a differential manometer 24 or the like, the diaphragm of which may consist of non-elastic material in which case the springs 25 serve as the directing force.

The pointer 22 cooperates with a scale 27 and the position of the pointer on the scale is dependent upon both the size of the throttling opening and the difference in pressure at opposite sides thereof, in other words, the velocity of flow. In place of the invariable scale 27 an indicating, recording or counting apparatus may be employed. The greater the throttling area adjusted through the device 16 the greater is the proportion of the longer to the shorter arm of the pointer and the greater also the movement of the pointer at the same difference of pressure.

Figure 3:
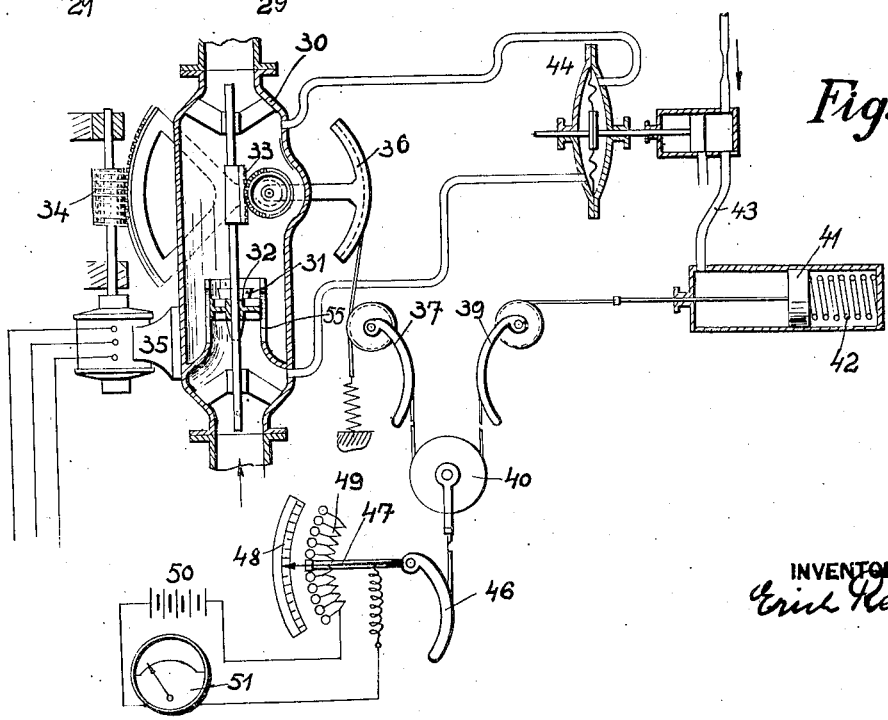
Figure 3 represents an arrangement with logarithmical composition of the two values.

In the form of construction shown in Figure 3, 30 is the regulating body. In this body a cylinder 31 with three-cornered openings 55 is arranged, in which a piston 32 works, the position of which determines the extent of the free passage in the openings 55. The piston 32 is actuated by a tooth-rod and a tooth-wheel 33 from the motor 35 through the medium of worm gear 34. The influence of the difference of pressure is shown in this case to be through the medium of an auxiliary power, which is especially advantageous if the difference of pressure is very slight. In a manner that is known and by means of the device 44, in accordance with the "balance" principle, a powerful pressure of the auxiliary fluid is produced, which varies with the difference of pressure according to a determined law. An arrangement of the kind is described for example in the American Patent 279,693 (Herr). A number of such arrangements also form a part of my other patent applications.

The auxiliary pressure comes through a connecting pipe 43 behind a piston 41 of a cylinder and moves this piston in co-operation with a pressure spring 42.

The combination of the throttling with the difference of pressure takes place in this form of construction in accordance with the logarithmic principle. For this purpose a segment 36 is firmly sealed on the axis of the tooth rod gear, by which segment a logarithmic cam 37 is rotated. A similar cam 39 is rotated by the movement of the piston 41 through the auxiliary pressure. These two movements are added together through a differential gear 40 and the sum of the two logarithms is transformed by a further logarithmic gear 46 into a proportional or other suitable movement. The pointer 47 shows or records on the scale 48 the proper value of the fluid-flow (per time unit). The indicators of the pointer can also be transmitted to a distance in a known manner or with the assistance of new devices for transmitting to a distance which form the object of some of my other patent applications.

According to the examples of construction shown the current or the potential in the circuit of a source of electric power 50 is varied with the aid of resistances 49 correspondingly to the position of the pointer 47 and read off in the measuring instrument 51. The electric value acting in the instrument 51 serves as measure for the velocity of flow. Such an arrangement for transmitting to a distance could however be carried out in accordance with the "balance" principle and if necessary by mechanical pneumatic or hydraulic method.

In the form of construction shown in Figure 6, 65 is the regulating casing in which 66 and 67 represent the doubly arranged throttling devices in the manner of the known relieving valve. By means of a rod 68, the flow is regulated for example through a hand wheel and a tooth rod. Instead of a device that is sensitive to the difference of pressure, in the present form of construction a part of the partition 65' arranged in the casing 65 is constructed so as to be movable as piston 70. The movement of the piston 70 caused by the difference of pressure is transmitted outwards by means of the piston rod 72. The piston 70 is balanced with springs 71. The combination of the effects of the two valves takes place by an electric method with the assistance of a dynamo or electro-magnetic machine 64. Under the assumption that this machine rotates at uniform speed, the current of the machine is dependent on the position of the brushes on the armature and on the strength of the magnetic field. Now if the pole pieces 73 of the machine 64 are connected with the rod 68 so that they move with the movement of the throttling device, the strength of the magnetic field that is effective on the rotor is varied. Thus the magnetic field varies with the extent of the throttle opening. If now through the difference of pressure the brushes of the machine 64 are operated with the assistance of a tension device 63, the combination of these two measures under proper adjustment of the machine, can deliver a potential or a current, which is definitely dependent on the velocity of flow and can serve as a measure for the same. This velocity of flow can then be read off on an electrical indicating instrument 76, counting apparatus 77 and recording apparatus 78 connected in circuit with the dynamo 64.

Figure 9 illustrates a form of construction with rotary regulating device which at the same time moves through the difference of pressure, which movement takes place as a force in the direction of the axis of the regulating device.

In the regulator casing 80 a cylinder 81 with suitable openings $81^1$ is arranged. In the cylinder 81 a piston 82 with openings 83 is guided. By the rotation of this piston 83 with the aid of a hand wheel 87 and a tooth wheel gear 86, 85 the through flow is regulated, in connection wherewith a larger or smaller part of openings 83 coincide with the openings $81^1$. The piston 82 is freely movable axially and is supported at 88 by a pressure bearing. The pressure acting on 88 sure bearing. The pressure acting on 88 which corresponds to the difference of pressure at the throttling place, is transformed in accordance with the equilibration principle into an electric quantity. In the example of construction illustrated this is effected with the assistance of an electro-magnetic balancing device. A source of electric power 97 includes in its circuit resistances 94 and 98 as well as the windings of the electromagnetic balancing device 92 and 93 and 90. From the same source of power 97 the regulating device 96 can also be fed, which is circuited in both directions through the contacts 91. From the resistance 98 the actual measuring circuit branches off, current in which acts in the indicating instrument 100, the recording instrument 101 or the counting instrument 102.

The action of this arrangement is as follows:—

If the throttling cross section be varied by the turning of the hand wheel 87 and thereby through rotation of the piston 82, the contact 99 is adjusted on the resistance 98 through the gear 99ª, 99ᵇ, and 99ᶜ. At the same time the difference of pressure varies and causes an axial movement of the piston 82, which is expressed in increased or reduced pressure on 88. Thereby the arm 88ª carrying the bearing 88 is moved and closes the one or the other contacts 91. This causes the closing of the circuit of the regulating motor 96, which moves the contact 95 over the resistance 94 until the electric coils 92 and 93 bring the coil 90 again into the position of equilibrium and thereby break the contact at 91. The current so regulated is thus, on the one hand in definite dependence on or a function of the difference of pressure on the piston 82, and, on the other hand, on the extent of the throttle opening 83, so that, with proper adjustment of the arrangement, the current in the instruments 100, 101 and 102 is in a definite proportion to the velocity of flow.

Figure 13 shows how a Pitot pipe can be employed in the arrangement according to Figure 3. 55 are recesses in the side of the cylinder shown in Figure 3, 32 is the movable piston. The Pitot pipe 57 is arranged in the recess 55 of the cylinder 31 and acts for example on a differential pressure device 44 as in Figure 3. Figures 14 and 15 show in two sections that in place of the recesses 55 as in Figure 3, conical recesses 60 may be provided in the interior cylinder surface 58 which, according to the position of the piston 59 allow a larger or smaller area of passage for the flowing medium.

In the arrangement according to Figure 11, a valve 106 that can hinge on 116 is provided in the regulating casing and comes suitably tangential to the flowing medium. This valve 106 is operated by hand or in any suitable manner by means of the tension device 117 and at the same time adjusts a contact 109 on the resistance 108. The resistance 108 is situated in the circuit of a source of electric power 107, in which there is a further resistance 110. The difference of pressure acts in a double chambered float casing 113, 114 on a float 112 which moves the contact 111 over the resistance 110. The value of the circuited resistance 108 is dependent on the throttling of the valve 106, and the value of the circuited resistance 110 on the difference of pressure in 113, 114. The arrangement is such that the indicating or recording or counting apparatus indicates the combined effect of the throttling and the difference of pressure, for example as velocity of flow.

In the float chamber 113, 114 is a specifically heavy medium which flows as such through the measuring place. The vessels are so formed and such gear is employed, that in the circuit of the measuring current there is as favourable as possible proportion between the original expressions of the values and the electric value.

Figure 12 illustrates in an easily intelligible form an arrangement that can be employed advantageously for measurements in air passages or flues of furnace installations or the like. The regulating device in this case is in the form of a slide, 120 and can be adjusted by hand through a chain 121 or automatically. The device dependent on the difference of pressure has the form of a bell. The openings which the slide 120 frees more or less may have different forms as shown in Figures 16 to 21.

Figure 19 represents a form of construction with two slides moving opposite one another, for ensuring greater symmetry of the flow. Even greater symmetry is assured according to Figure 20, which arrangement is similar to the diaphragm of photographic apparatus. Figure 21 shows a screen slotted perpendicularly to the direction of flow with cam-shape slot by the rotation of which the desired regulating is assured.

Figure 22 shows a double sided valve and Figure 23 is intended for very large areas of flow and small differences of pressure and consists of a number of valves as in Figure 22 or Figure 11 or the like. This form of construction is far more compact and lighter and the stream of the medium has not so much tendency to eddying.

Figure 24 shows the employment of a Pitot pipe 130 in open flow. The regulating is effected by a damming device (gate) 131 and the movement of the part 131 is combined with the difference of pressure in 132 in the manner described above.

With fluids it is also possible to derive a function of the flow at the place of throttling from the height of the fluid. Such an arrangement is illustrated in Figure 25. A damming device (gate) 143 regulates the stream 145 and is operated by means of a gear 144. This gear 144 also operates a pointer 142. A float 140 raises and lowers a scale 141 (similarly as in Figure 1) so that the pointer 142 indicates the correct velocity of flow on the scale 141.

Figure 26 shows how the alteration in the height of the fluid can act as hydrostatic pressure of the fluid on a movable diaphragm 150 of the vessel 154. 151 is a counter-pressure spring. The movement of the diaphragm 150 is transmitted to a lever 152, the movement of which is joined to the position of the throttling device 153 in the manner described above.

According to Figure 27 the alteration of the level of the fluid in the vessel 164 acts so that the fluid according to its level fills to a greater or less extent through a connecting flexible pipe 161 an auxiliary vessel 160 suspended on a spring 162 in connection wherewith the weight of the vessel 160 co-operates with the position of the throttling device 163.

In Figure 28 a more complicated case is illustrated. To the position of the regulating device 175 a value is joined which depends on the difference of two fluid levels and indicates in 170. The whole arrangement is suspended on a compensating lever that raises and lowers this arrangement according to the average height of the two levels. In connection herewith the pointer 171 gives this average height.

Figure 29 shows a measuring and controlling arrangement in which the fluid flows into a chamber with constant pressure or flows out of such a chamber (atmospheres). In this case regard to the over-pressure in relation to this chamber only suffices so that the float vessel 180 can be open. Here the movements of the float 181 co-operate with the position of the throttling device 182.

According to Figure 30 the different throttling is effected by varying the length of the throttle, the throttle cross-section being uniform. For this purpose a throttle device 192 of invariable cross section is pushed into the outflow opening 191 of the vessel 190 and the position of this device 192 is joined for example to the height of the fluid.

It will be noted that in all forms of the invention described, the flow of fluid is positively regulated through throttling by outside influences, for instance manually or by auxiliary power apparatus, and that the measuring or indicating devices serve to indicate the extent of regulation whereby proper regulation can be assured. Furthermore, the regulating mechanism, in addition to regulating the flow, serves at the same time to cooperate with means responsive to a fluid condition caused by the regulation to control actuation of the indicating or measuring devices.

What I do claim as my invention and desire to secure by Letters Patent is:—

1. A flow regulating and measuring device, comprising flow resisting means adjustable to vary the flow opening, means for actuating said flow resisting means to vary the size of said flow opening, means variable in accordance with variations in the flow opening, means responsive to a fluid condition caused by variations in the flow opening, and means actuated by cooperation of both of said third-mentioned and said last-mentioned means, the result of said actuation being dependent upon both the size of said flow opening and said fluid condition.

2. A flow regulating and measuring device, comprising flow resisting means adjustable to vary the flow opening, means for actuating said flow resisting means to vary the size of said flow opening, means variable in accordance with variations in the flow opening, means responsive to a fluid condition caused by variations in the flow opening, means actuated by auxiliary energy, and means actuated by cooperation of said third-mentioned means and said means responsive to said fluid condition for varying the auxiliary energy for said last-mentioned means in a manner dependent upon both the size of said flow opening and said fluid condition.

3. A flow regulating and measuring device, comprising flow resisting means adjustable to vary the flow opening, means for actuating said flow resisting means to vary the size of said flow opening, means variable in accordance with variations in the flow opening, means responsive to a fluid condition caused by variations in the flow opening, a source of auxiliary energy, means actuated by cooperation of said third-mentioned means and said means responsive to said fluid condition for varying auxiliary energy in a manner dependent upon both the size of said flow opening and said fluid condition, and means for measuring said auxiliary energy.

4. A flow regulating and measuring device comprising flow resisting means adjustable to vary the flow opening, means responsive to a fluid condition caused by variations in the size of said flow opening, means actuated in accordance with variations in said flow opening, means actuated by auxiliary electric energy, and means actuated by cooperation of said responsive means and said third-mentioned means for varying the auxiliary energy for said last-mentioned means, whereby the actuation of said last-mentioned means is dependent upon both the size of said flow opening and said fluid condition.

5. A flow regulating and measuring device, comprising flow resisting means adjustable to vary the flow opening, means responsive to a fluid condition caused by variations in the size of said flow opening, a dynamo-electric device, and means for varying the output of said dynamo-electric device in accordance with both the variations in said flow resisting means and said responsive means, whereby said output is dependent upon both the size of said flow opening and said fluid condition.

6. A flow regulating and measuring device, comprising flow resisting means adjustable to vary the flow opening, means for actuating said flow resisting means to vary the size of said flow opening, means actuated in accordance with variations in said flow opening, means actuated in accordance with a fluid condition caused by variations in the size of said flow opening, and means for causing cooperation of said last two-mentioned means to produce a result dependent upon both the size of said flow opening and said fluid condition.

7. A flow regulating and measuring device, comprising flow resisting means adjustable to vary the flow opening, a dynamo-electric device having variable brushes and a variable magnetic field, means for varying said magnetic field in accordance with variations in said flow opening, and means for varying the position of said brushes in accordance with variations in a fluid condition caused by variations in the size of said flow opening, whereby the electrical output of said dynamo-electric device is dependent upon both the size of said flow opening and said fluid condition.

8. A flow regulating and measuring device, comprising flow resisting means adjustable to vary the flow opening, a dynamo-electric device having variable brushes and a variable magnetic field, means for varying said magnetic field in accordance with variations in said flow opening, means for varying the position of said brushes in accordance with variations in a fluid condition caused by variations in the size of said flow opening, whereby the electrical output of said dynamo-electric device is dependent upon both the size of said flow opening and said fluid condition and a measure for the velocity of flow, and means for measuring the electrical output of said dynamo-electric device.

9. A flow regulating and measuring device, comprising a flow resisting means adjustable to vary the flow opening, means operated by auxiliary power for actuating said flow resisting means to vary the flow opening and regulate the flow, means operated by said second-mentioned means in accordance with the variations in said flow opening, means responsive to variations in a fluid condition caused by the variations in the flow opening, and means for causing cooperation of said last two-mentioned means to produce a result dependent upon both the size of said flow opening and said fluid condition.

10. A flow regulating and measuring device, comprising a flow resisting means adjustable to vary the flow opening, means operated by auxiliary power for actuating said flow resisting means to vary the flow opening and regulate the flow, means operated by said second-mentioned means in accordance with the variations in said flow opening, means responsive to variations in a fluid condition caused by the variations in the flow opening, indicating means, and means for producing cooperation of said last two-mentioned means to actuate said indicating means to make an indication dependent upon both the size of said flow opening and said fluid condition.

11. A flow regulating and measuring device, comprising a flow resisting means adjustable to vary the flow opening, means operated by auxiliary power for actuating said flow resisting means to vary the flow opening and regulate the flow, means operated by said second-mentioned means in accordance with the variations in said flow opening, means responsive to variations in a fluid condition caused by the variations in the flow opening, indicating means operated by auxiliary energy, means for varying said auxiliary energy, and means for producing cooperation of said third-mentioned means and said responsive means to actuate said means for varying the auxiliary energy, whereby variations in said auxiliary energy are produced dependent upon both the size of said flow opening and said fluid condition.

In testimony whereof I have hereunto set my hand.

ERICH ROUČKA.